United States Patent [19]
Shur

[11] Patent Number: 5,809,233
[45] Date of Patent: Sep. 15, 1998

[54] METHOD OF MAPPING FROM ATMARP TO NHRP

[75] Inventor: David Hilton Shur, Middletown, N.J.

[73] Assignee: Lucent Technologies Inc., Murray Hill, N.J.

[21] Appl. No.: 567,517

[22] Filed: Dec. 5, 1995

[51] Int. Cl.[6] .............................. G06F 13/00; G06F 13/14
[52] U.S. Cl. ................ 395/200.6; 395/500; 340/825.52; 370/402; 370/94.3
[58] Field of Search ................................. 370/402, 85.13, 370/94.3; 340/825.52; 395/280, 200.02, 500, 416, 200.6

[56] References Cited

U.S. PATENT DOCUMENTS

| | | | |
|---|---|---|---|
| 5,239,542 | 8/1993 | Breidenstein et al. | 370/79 |
| 5,287,103 | 2/1994 | Kasprzyk et al. | 340/825.52 |
| 5,327,544 | 7/1994 | Lee et al. | 395/500 |
| 5,442,630 | 8/1995 | Gagliardi et al. | 370/85.13 |
| 5,491,693 | 2/1996 | Britton et al. | 370/85.13 |
| 5,583,862 | 12/1996 | Callon | 370/397 |
| 5,636,216 | 6/1997 | Fox et al. | 370/402 |

OTHER PUBLICATIONS

Marshall; 'Classical IP Over ATM: A Status Report: The IETF Spec helps bridge the gap between ATM and legacy IP networks'; Data Communications; p. 103, Dec. 1995.

Nolle; 'How Routers can get more respect. (Next Hop Routing Protocol)'; Internetwork; v6, n9, p. 24(1), Sep. 1995.

*Primary Examiner*—Thomas C. Lee
*Assistant Examiner*—Rehana Perreen

[57] ABSTRACT

The present invention is directed to a method of resolving protocol addresses using new protocols. Gateways that map ATMARP packets to NHRP packets are placed in the network to make translations between the two protocols. Therefore the installed base of networks can be maintained, with added functionality. Techniques for handling those areas where the two protocols do not match directly such as sub-address fields, purge packets and holding time expiration are also disclosed.

23 Claims, 5 Drawing Sheets

| 0 | 8 | 16 | 31 |
|---|---|---|---|
| HW TYPE || PROT TYPE ||
| SOURCE ADDR TYPE/LENGTH | SUB ADDR TYPE/LENGTH | OPERATION ||
| SLEN | TART ADDR TYPE/LENGTH | SUB ADDR TYPE/LENGTH | TLEN |
| SOURCE ATM NUMBER ||||
| SOURCE ATM SUBADDRESS ||||
| SOURCE PROT ADDRESS ||||
| TARGET ATM NUMBER ||||
| TARGET ATM SUBADDRESS ||||
| TARGET PROT ADDRESS ||||

METHOD OF MAPPING FROM ATMARP TO NHRP

TECHNICAL FIELD

This invention relates to data communications and computer networking.

BACKGROUND OF THE INVENTION

Current data communications is digital, meaning that the information is transmitted between devices using bits(0's and 1's). A video clip, data, song, or message is transmitted as a continuous stream of bits and then these bits are sequentially grouped and separated into smaller units called packets. The packets representing information e.g. a video clip are independently sent into the communications network and then recombined at the other end to form the original video clip, data, song, or message. The packets are segmented, recombined, and forwarded according to a set of rules and guidelines. These rules and guidelines are called a protocol. A detailed discussion of layered protocols can be found in Tannenbaum, Computer Networks, Prentice Hall, Englewood Cliffs, N.J., 1992.

The packets are generated, processed and dismantled through physical architectural devices present in the network. The architectural devices either create, send, process, receive or dismantle the packets. FIG. 1 displays a network architecture. A bus topology 100 and a ring topology 200 are displayed. In a bus topology 100, a communicating device 10 communicates with a device 20 by sending a packet along a cable 15. Item 200 displays a ring topology. In a ring topology, a communicating device 50 would communicate with a device 60 by transmitting a packet along the communications cable 55.

In addition to the local area environments, different LANs communicate across communications networks. For example in FIG. 1, the bus topology 100 may be in California and the ring topology 200 may be in New York. A transmitting device 10 would still be able to communicate with a remote device 50 by going across the packet switching network 300. Packets transmitting from the bus topology 100 may be brought onto the packet switching network 300 through a bridge 30, while packets may be transmitted from the ring topology 200 onto the network 300 through a router 40. Both the bridge 30 and the router 40 process packets between networks. When a bridge 30 or router 40 receives a packet, the bridge/router reads the target address of the packet and then compares the target address with its routing table to determine the destination for the packet. The router/bridge maintains the routing table in a cache area. The cache is normally a read/write memory area of the device. When new devices come on the network, the new device may send a registration packet through the bridge/router to register the address of the new device in the cache area. However, when a device has not communicated for a period of time, the information in the routing table will time out, and the routing information will be removed from the routing table (cache area).

The bridge 30 and the router 40 both serve key functions within the network. All the packets that exit a LAN for the packet switching network in our example, must go through the bridge 30 or router 40. When the bridge/router passes packets from the LANs to the packet switching network, the bridge/router is said to be a gateway, because it passes packets from one architecture (e.g. Local area network architecture) to a second architecture (e.g. packet switching architecture). The bridge/router is also a gateway because the bridge/router may have two different protocols implemented in the bridge/router. Therefore, the bridge/router may be the physical device that does some of the translation from one protocol to another. However, the bridge/router is not the only place that protocol translation can occur. In the average network protocol compatibility and translation software is placed in many different devices. For example in FIG. 1, part of the software to make a protocol translation, may reside in device 10 and another part may reside in the bridge 30. When the protocol translation software is separated like this, the portion that is located in the device 10 is often called "client software" and the software that is located in the bridge 30 is often called "server software". The client software normally send information to the server software to get information that is necessary to complete a communications connection.

One example of the interaction between client and server software can be demonstrated with an address resolution protocol. If device 10 has to send a packet to device 50, device 10 has to know the pathway to get to device 50. Therefore the client software in device 10 will send out a REQuest to the server software in bridge 30, to find the pathway to device 50. The REQuest for pathway information are called ARP REQuest. When the bridge 30 receives the REQuest for information, the bridge 30 will look in its routing table to see if it has the next location(next hop) in the route to get to device 50. If not, the bridge will send out an ARP REQuest. This process will continue until someone receives the REQuest that can find the address of device 50. In this particular example this would be router 40. Router 40 will then send the answer back to bridge 30, which will in turn notify device 10. The device 10 will then forward the packet along the resolved route to device 50. This process is called address resolution, and the protocols that implement this process are called address resolution protocols.

An address resolution protocol is implemented by defining bit fields within the packet to have meaning, defining different types of packets, and defining the sequencing of packets. For example, the first sixteen bits may define the address of the target device (the device you are trying to get to). The next sixteen bits may define the address of the source (the computer address of the device that the packet was transmitted from). In addition, different types of packets may be defined. For example, in address resolution protocols (i.e. ATMARP, NHRP) there are registration packets, query packets, response packets and purge packets.

The registration packet is the initial packet that may be issued to a device to let all of the bridges/routers on the network know that the device is part of the network. So a new device that is placed on the network may issue a registration packet so that the location of the new devices address can be put in the routing table of the closest bridge/router to the new device. A query packet is issued when a transmitting device needs to find the path to a remote address. The query packet usually results in a response from a bridge/router that has the remote address in its routing table. The bridge/router that has the remote address in its routing table will usually respond with a response packet which contains the new address. Lastly, when an address is not being resolved or a path is not functional a purge packet may be issued which takes the address out of the routing table.

FIGS. 2 and 3, show the packet formats of two different address resolution protocols, the Asynchronous Transfer Mode (ATM) Address Resolution Protocol (ARP) packet, and a Next Hop Resolution Protocol (NHRP) packet. FIG. 2 indicates the fields and the number of bits for each field in an ATM ARP packet. FIG. 3 details the format for an NHRP REQuest packet, NHRP reply packet and NHRP register packet.

As ATMARP and NHRP packets are processed through the network, different bit fields in the packets add functionality to the respective protocols. For example, the sub addressing fields in the ATMARP packets, enables more detailed address designation in a network. The holding time field in an NHRP packet specifies the amount of time that a target address is valid. The P and B bits in the NHRP protocol give functionality to the NHRP protocol that is not present in the ATMARP protocol. The P bit details if there is a negative reply (i.e. a communications server responds that it cannot resolve the address). The B bit defines whether the information is stable (when the packets are all transmitted along the same route they are considered stable, however if the packets are routed through different paths the B bit can be set to show that the packet may be unstable). A general discussion of computer protocols may be found in Gerard J. Holzman, Design & Validation of Computer Protocols, Prentice Hall, Englewood Cliffs, N.J., 1991.

In present day networks, some devices are configured to resolve addresses using ATM ARP and some devices are designed to resolve addresses using NHRP. The question becomes what happens when ATM ARP cannot resolve an address and NHRP has to be used. FIG. 4 details the packet transactions that occur in this scenario. The source 400 would use client software to make the REQuest (client software) located in the source 400. At step 405, the source 400 would use the ATMARP client 410 to send an ARP-REQuest 415 to an ATMARP server 420 in the network 402. The ATMARP server 420 replies with an ARP-NAK (a non acknowledgment packet) 425, indicating that an address mapping for the destination address was not found. The source 400 then initiates NHRP procedure 430 NHRP client software 435 located in source 400 issues an NHRP REQuest 440 to NHRP server one 445. NHRP server one denoted by 445 then forwards the REQuest denoted by 450 toward a router that can resolve the address. Ultimately NHRP server N denoted by 455, which can resolve the REQuest is reached through a sequence of packet hops. NHRP server N denoted by 455 delivers a NHRP reply 460 to NHRP server one denoted by 445, which forwards the resolved address 470 back to the NHRP client 435. From that point on, the source 400 will know how to send its packet to the required destination. From FIG. 4 it is clear that in order to resolve an address in a network that has both ATMARP and NHRP devices, the source 400 would have to be able to translate both of these protocols.

A source that is able to translate both ATMARP and NHRP would be costly to implement. Most devices that have the ability to perform the ATMARP translation, would require that client software be purchased to perform the NHRP functions. In addition, if end users decided not to buy the new NHRP software, they would be missing some of the features available in NHRP that are not available in ATMARP. Therefore it would be advantageous to enable ATMARP based devices, to be able to resolve addresses using new protocols that have greater functional capability such as NHRP.

Mapping between protocols (e.g. ARPANET layered model protocols and Open System Interconnection protocols) has been implement in a protocol translator (gateway). Implementing a protocol translator requires that the designers, take into account every possible type, sequence, and format of packets in one protocol and map them into another protocol. However, this is rarely ever a one-to-one mapping of data bits to data bits. How a designer handles the bits that don't map directly, and the sequence of packets that don't translate directly can result in having a functional protocol translation or a disfunctional protocol translation, where translator packets may be sent but there is no response.

SUMMARY OF THE INVENTION

A mapping from ATMARP to NHRP is disclosed. An ATMARP server/NHRP client gateway is presented. In the ATMARP sever/NHRP client gateway, an ATMARP packet format is mapped to an NHRP packet format. Therefore a Source does not require both an ATMARP client and an NHRP client. The Source can retain the installed base of network software, but still expand and gain the functionality of global network protocols such as NHRP.

The mapping of ATMARP to NHRP occurs in the ATMARP/NHRP server/gateway. In the gateway the bits in one protocol are redefined into the bits in the other protocol. In addition intelligence is put in the gateway, the source, and the servers, to enable these devices to handle aspect of one protocol that don't map directly into another protocol. Although not all of the bits map directly from one protocol into the other, the method disclosed in the present invention enables a complete mapping between these protocols.

It has been found that message sequence problems and bit matching problems cause an ATMARP to NHRP mapping to fail. Specifically failures resulting from NHRP holding time expiration, NHRP purge packets, problems of new network paths, and the lack of subaddressing in NHRP are disclosed.

These problems are addressed and the invention implements a method for solving the problems of holding time expiration of an NHRP reply, and the NHRP purge message by sending a properly timed non-acknowledgment packet or not responding to particular packet REQuest. Further, new paths are addressed in the ATMARP to NHRP mapping by setting the B bit in the NHRP packets. By setting the B bit a source understands that there is another path in the network, and utilizes that path to continue communications. Lastly the lack of subaddressing fields in NHRP is accommodated for, by deriving the address type/length field of NHRP from the NHRP source/target ATM length. The derivation is performed by assigning values to the first 8 bits of the NHRP source/target ATM length. The first six bits of the NHRP packet are set to the first six bits of the NHRP length field. The seventh bit is set to zero if the length of the ATM address in the NHRP reply equals twenty and to one otherwise. The eight bit is set to zero.

BRIEF DESCRIPTION OF THE DRAWINGS

The objects, advantages and novel features of the invention will be more fully apparent from the following detailed description when read in connection with the accompanying drawings wherein.

DETAILED DESCRIPTION OF THE INVENTION

The present invention discloses a methodology and architecture for mapping the Address Resolution Protocol (ARP) to the Next Hop Resolution Protocol (NHRP). A discussion of the fields that can be mapped directly, and those than cannot be mapped directly is disclosed. Mapping failures are found and, solutions are presented to avoid such failures.

In a mapping from ATM ARP to NHRP the present invention discloses that the holding time parameter of an NHRP reply and the NHRP purge packet will cause a translator to fail. The holding time parameter will cause a translator to fail because it is not until, holding time expires, and entries are removed from the cache of a router, that new pathways will be used by the router. Purge packets will cause the translator to fail because, if a purge packet is issued at the wrong time it can remove a preferred path from the cache of a router earlier than the entry should be removed or after the entry should be removed. In addition, the present invention discloses a methodology for handling subaddresses in the ATMARP packets since the NHRP protocol does not support subaddressing. Lastly, the additional capability of NHRP to determine usable paths is exploited.

Figures 1, 2:
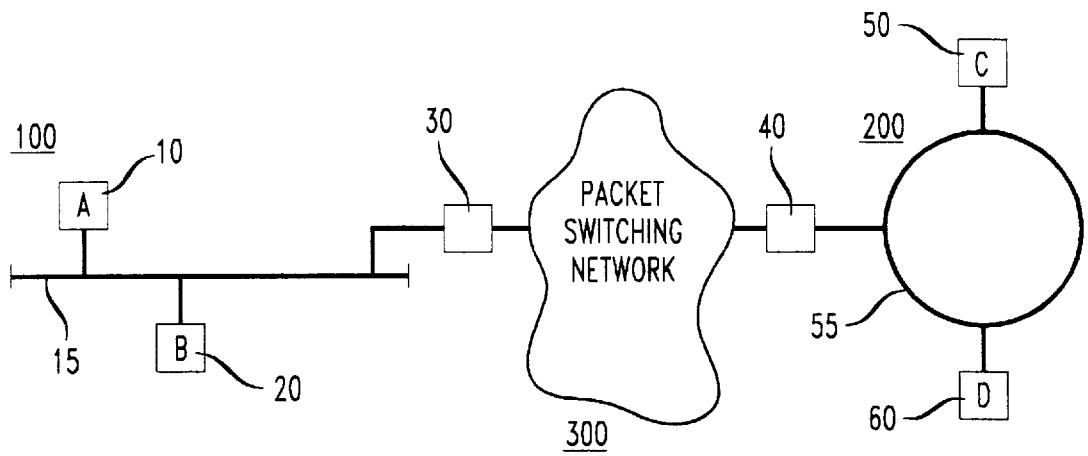
FIG. 1. displays a typical network architecture
FIG. 2. displays an ATM ARP packet format.
Figure 3:
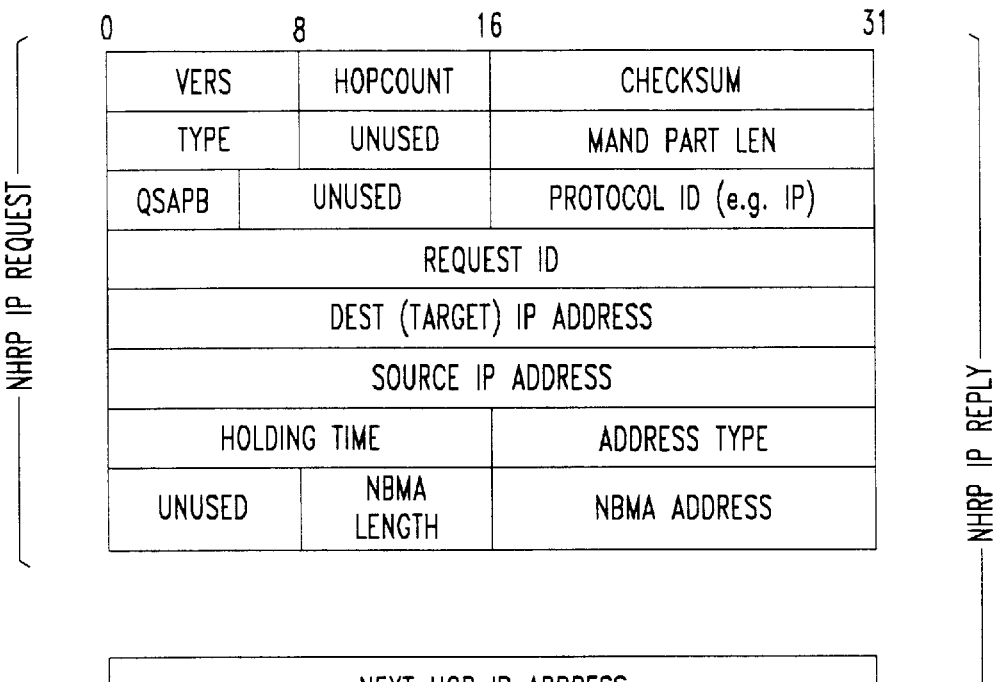
FIG. 3. displays an NHRP REQuest, and NHRP reply and an NHRP register packet format.
Figure 4:
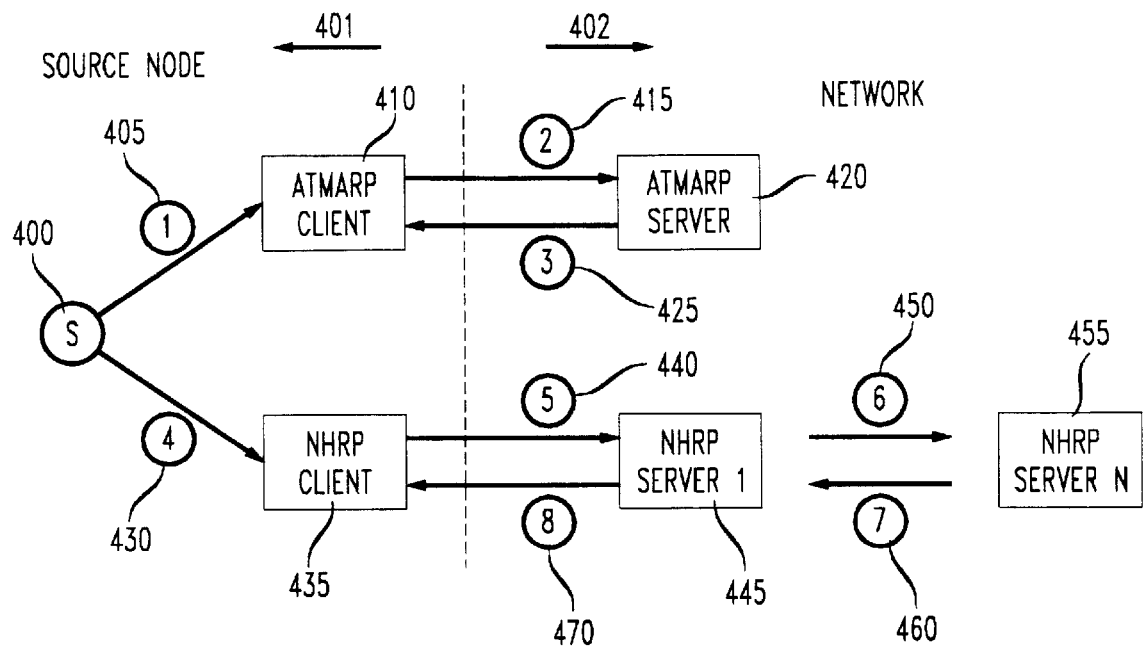
FIG. 4. prior art packet processing sequence.
Figure 5:
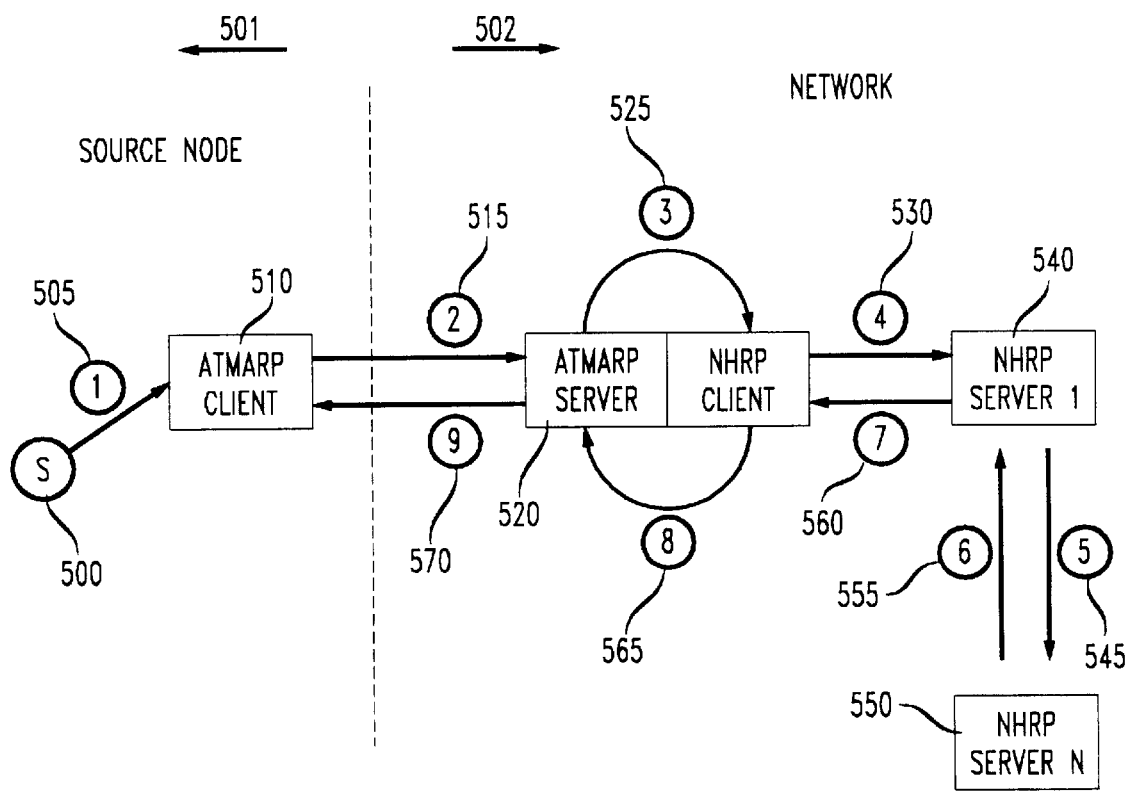
FIG. 5. displays the disclosed network architecture an packet processing sequence.

FIG. 5 discloses the architecture used in the present invention. Source 500 initiates an ATMARP procedure 505 based on routing table entry. The ATMARP client 510 issues an ARP-REQuest 515 to an ATMARP/NHRP server/gateway 520 in the network. The server/gateway recognizes that it does not have an entry for the destination, and maps ATMARP parameters into an NHRP query. The gateway, then issues an NHRP REQuest 530 to NHRP server one 540, which forwards the REQuest 545 towards a destination. NHRP server N, 550 which serves the destination device responds with NHRP reply 555, directed back towards NHRP server one denoted by 540. NHRP server one forwards the NHRP reply back towards ATMARP server/NHRP client gateway 520, which forwards the reply 570 back to the NHRP client 510.

Figure 6:
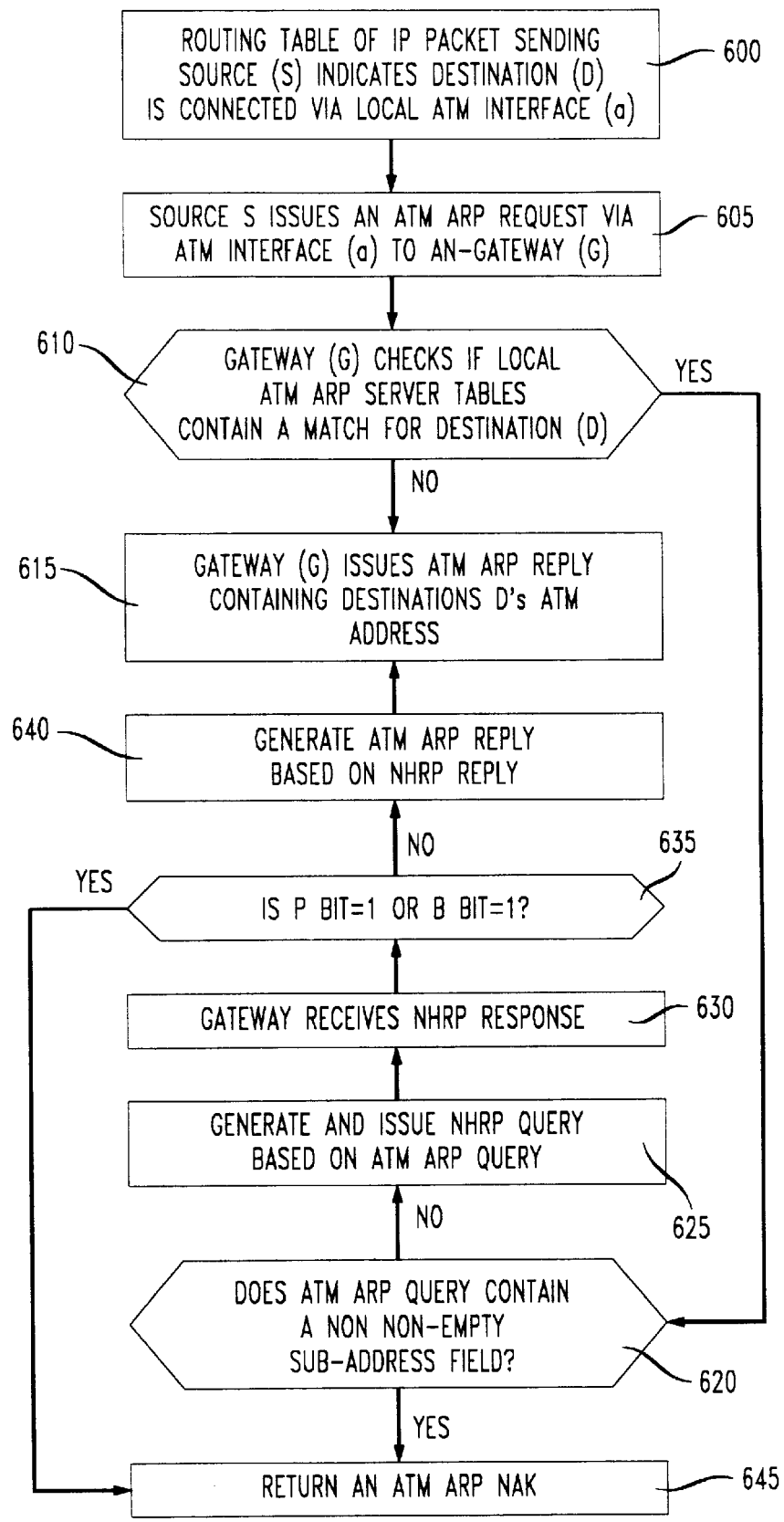
FIG. 6. displays a flow chart of the methodology disclosed in the present invention FIG. 7. displays a network architecture.

An implementation of the present invention is disclosed in the flow chart presented in FIG. 6. At point 600 a routing table of a source (S) indicates that the destination (D) is connected via a local ATM interface (a). At 605, Source (S) issues an ATMARP REQuest via ATM interface (a) to a gateway (G). At point 610 a gateway (G) checks if local ATM ARP server contains a match for destination (D). If gateway (G) does have a match, at 615, gateway (G) issues ATM ARP reply containing destinations D's ATM address. If gateway (G) does not have a match, at 620, the subaddress field of the ATM ARP query is checked to determine if it is a non-empty field. If the field is non-empty an ATM ARP NAK is returned as denoted by 645. If the field is not non-empty an NHRP query that is based on the ATM ARP query is generated and issued as denoted by 625. When the gateway receives the NHRP response at point 630, the response is checked to see if the P bit=1 or the B bit=1 as denoted by 635. If either the P or the B bit equals 1 then an ATM ARP NAK is returned as denoted by 645. If neither the P bit or the B bit equals 1 then an ATM ARP reply is generated based on a NHRP reply, as denoted by 640.

The ATM ARP queries are mapped to NHRP queries as follows:

NHRP Version=this version of NHRP obtained from the NHRP software version Hopcount=Configuration parameter located in the network in which the gateway is placed. Will be entered by network administrator (default value=16). Checksum=computed over NHRP packet (calculated by NHRP software). The standard algorithm is to treat the packet as a sequence of 16 bit integers, add them together using one's complement arithmetic, and then taking the one's complement of the result).

(Comer.)

Type=REQuest Mandatory Path length=length in octets of mandatory part (calculated by NHRP software)

Q=1 (if gateway is a router), 0 otherwise

A=1 (authoritative response desired)

S,P,B=0

Prot.ID=ATM ARP Protocol type as copied from the ATM ARP query packet.

REQuest ID=calculated from NHRP software (taken from a 32 bit counter that is incremented with each new NHRP REQuest).

Destination (Target) IP address=ATMARP Target Protocol Address as copied from the ATM ARP query packet Source Address=address of gateway(local configuration information that depends on the network in which the gateway is deployed).

Source holding time=0 (not used for queries)

Address type=ATM ARP hardware type copied from ATM ARP query packet.

ATM length=ATM ARP source address length copied from ATMARP packet.

Certain address fields in the ATM ARP response do not map directly to the NHRP response. These include the type and length of source and target ATM number. These quantities must therefore be derived from the NHRP source/target ATM ATM length. The methodology for deriving the address type/length field in an NHRP packet is as follows:

Bit 8=0

Bit 7=0, if the length of the ATM address in the NHRP reply=20 1, otherwise

Bit 6-1=first 6 bits of NHRP ATM length.

The NHRP responses are mapped to ATMARP responses by mapping data bit fields in the NHRP packet to data bit fields in the ATMARP packet. The specific fields that are mapped relative to each other are the following:

Hardware type=NHRP address type

Protocol type=NHRP Protocol ID

Source Address Type/Length=defined below

Sub Address Type/Length=Sub-address length set to 0

Operation=Reply (NHRP bit set to 1), Nak (NHRP bit set to 0)

Target ATM Sub Address Type/Length=defined below

Target ATM Sub Address Type/Length=Sub-address length set to 0

Length of Source protocol Address in octets=4 (for IP version 4)

Source ATM Number=Source NHRP ATM address

Source ATM Sub-address=0

Source Protocol address=Senders protocol address (stored in gateway)

Target ATM Number=NHRP ATM target address

Target ATM Sub-address=0

Target protocol address=NHRP Target Prot. Address.

In addition to the mappings defined above, in an NHRP response if the P bit is zero, implying a negative reply i.e., the set of NHRP servers in the network are unable to find a match for the target address, therefore an ATMARP NAK must be returned to the requester. If the B bit is zero, implying that the information is not stable(a new pathway has been defined in the network), then an ATMARP NAK must be returned to the requester.

Figure 7:
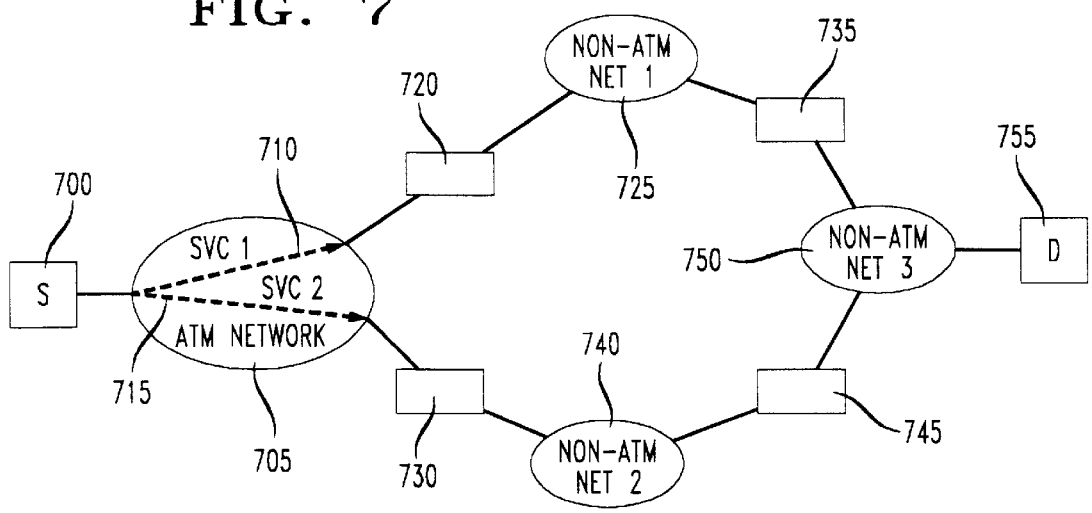

An example of how the P and the B bits stop network failure is presented in FIG. 7. Assume that there is a source 700 and an ATM Network 705. SVC1 denoted by 710 represents the initial preferred path resulting from an NHRP query. Suppose that router R3 denoted by 735 fails after SVC1 denoted by 710 is established across R1 denoted by 720. In normal NHRP operation, R1 denoted by 720 would remove the current routing path for R3 from cache and generate a purge message to cause the source 700 to reissue another NHRP query. This new NHRP query would find the path through R2 denoted by 730 via SVC2 denoted by 715. This would become the new preferred path. In the case where S denoted by 700 is a gateway, there is no way to propagate the purge message to the requesting source. Therefore all traffic to D denoted by 755 would continue to follow the original path via SVC1 denoted by 710 until the ATM ARP cache in source 700 times out removing the path via SVC1 denoted by 710. Therefore D denoted by 755 would not be reached even though there is an alternative path through R2 denoted by 730. By evaluating the P and B bits in the NHRP protocol, when S denoted by 700 is a gateway, R2 denoted by 730 is aware that two paths from S denoted by 700 to D denoted by 755 exist; and so sets the B bit to zero, indicating unstable information. The gateway acts upon this information by withholding information from the requesting ATM ARP client S denoted by 700. The gateway issues an ATM ARP NAK, which prevents the call from being set-up.

There are some additional functions in the NHRP protocol which cannot be directly mapped into the ATM ARP. These include the holding time parameter of the NHRP reply, which specifies how long the information in the reply will be valid. There is also another NHRP message, the "purge" packet, which is sent by NHRP responders to NHRP requesters to delete previously stored cache entries at the requester. The gateway does not need to take any action with respect to ATMARP either when the NHRP holding time expires or when a purge packet is received. There are two cases in this category. First, if the destination is directly attached to the ATM network. In this case, if an ATMARP client has stale cache information due to stale NHRP information, then an attempt to setup a call to that destination will fail. If failure occurs, established ATMARP procedures require that the client remove the associated ATMARP entry. This will cause the client to issue an new query which when translated to NHRP, and responded to, will contain up-to-date ATM address information, and therefore the new ATMARP cache entry will also be up-to-date. Subsequent calls to that destination will therefore be successful, assuming no other errors take place. The second scenario may occur when, the destination is not the ATM network but is attached by a router and the path from the router to the destination is "stable" meaning that only one path from the router to the destination exists. In this case, where the gateway either receives a purge packet or the holding time expires, the gateway would normally do nothing. If the destination is down then connectivity is lost. If the destination (or a network in the path to the destination) gets reattached to the ATM network via a different router than the original one, then when the ATM ARP cache times out on the client, a new ATM ARP query will be re-issued, the gateway will translate this to an NHRP query, and the ATM address of the new router will be correctly identified.

Figure 8:
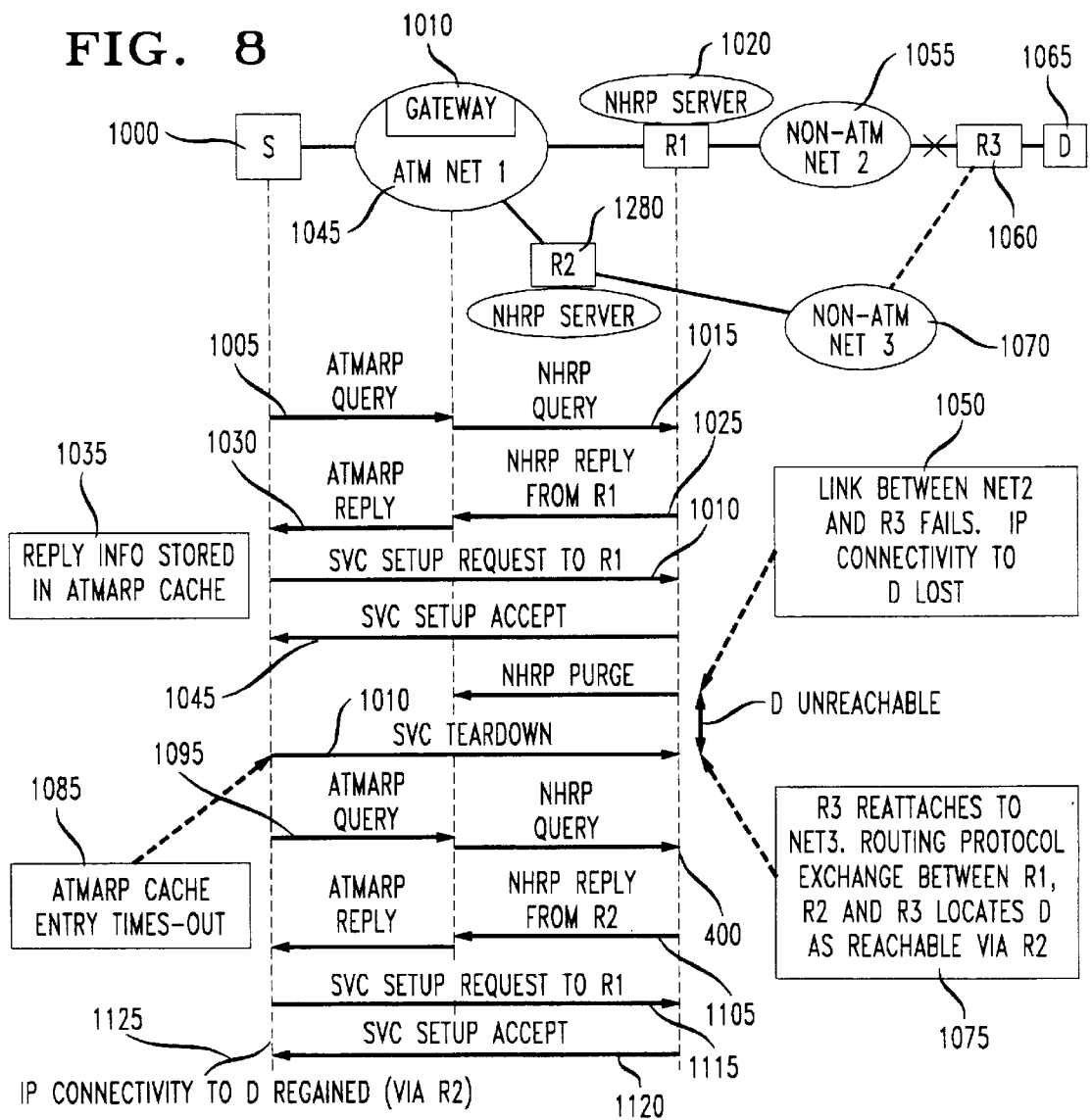
FIG. 8. displays a the packet sequence that results from a purge REQuest.

A sequence diagram of how purge packets function under the disclosed invention is displayed in FIG. 8. Purge packets and ATMARP cache time-out are addressed in the present invention in the following way. In FIG. 8 a source 1000 sends an ATMARP query through a gateway 1010. The ATMARP query is translated to an NHRP query 1015 which is transmitted to router one denoted by 1020. An NHRP reply 1025 returns back through the gateway 1010. The gateway translates the NHRP reply 1025 to a ATMARP reply 1030. The ATMARP reply 1030 is stored in the ATMARP cache 1035. A service setup REQuest 1040 is then sent to router one 1020 directly through the network 1045. Router one 1020 accepts the router REQuest 1045. However, suppose that at this point the link between network two 1055 and router three 1060 is lost as denoted by 1050. The destination denoted by 1065 is unreachable. If router three 1060, then reattaches through network three 1070, router two 1080 will be used. After an operator set, amount of time, the ATM cache entry in the source will time out as denoted by 1085, and a service teardown sequence 1090 will be initiated. A second ATM ARP query 1095 will be issued from the source. The gateway 1010 will translate this query into a NHRP query 1100. R2 denoted by 1080 will then issue an NHRP reply 1105. The NHRP reply 1105 will be translated in the gateway 1110 into an ATMARP reply 1110. The source will then set up service to router two, as denoted by 1115, and router two will accept the service setup REQuest as denoted by 1120. As a result of this packet transaction, connectivity is regained through router two, as denoted by 1125.

While several embodiments of the invention are disclosed and described, it should be appreciated that various modifications may be made without departing from the spirit of the invention or the scope of the subjoined claims.

What is claimed is:

1. A method of operating a network utilizing ATMARP and NHRP, said method comprising the steps of:

issuing an ARP-REQuest, mapping said ARP-REQuest to an NHRP-REQuest, resolving said NHRP-REQuest thereby generating an NHRP-reply, Mapping said NHRP-reply to an ATMARP-reply, and issuing said ATMARP reply.

2. A method as claimed in claim 1 wherein said ARP-REQuest is performed in a source.

3. A method as claimed in claim 1 wherein said mapping said ARP-REQuest to an NHRP-REQuest step is performed in the network.

4. A method as claimed in claim 1 wherein said mapping said NHRP-reply into an ATMARP-reply is performed in a network.

5. A method as claimed in claim 1 wherein said ATMARP-reply is issued to the source.

6. A method as claimed in claim 1 wherein said step of mapping said ARP-REQuest to an NHRP-REQuest is performed by mapping NHRP version bits to current NHRP version, Hopcount bits to zero, checksum bits to checksum of NHRP-REQuest packet, type bits to REQuest bits, mandatory path length bits to length in octets of mandatory part, Q bit to one, A bit to one, S bit to zero, P bit to zero, B bit to zero, Protocol ID bit To ATM ARP protocol type bits, REQuest ID incremented with each new NHRP REQuest, destination address bits to ATMARP target protocol address bits, source address bits to address of gateway, source holding address bits to zero, address type bits to ATM ARP hardware type bits, ATM length bits to ATM ARP source address length bits.

7. A method as claimed in claim 6 wherein said Q bit is set to zero.

8. A method as claimed in claim 1 wherein said step of mapping said NHRP responses to ATMARP responses Is performed by mapping hardware type bits to NHRP address type bits, protocol type bits to NHRP protocol ID bits, sub address type/length bits to zero, operation bits to reply bits when NHRP bit is set to one, target ATM sub address type/length bits to zero, length of source protocol address to four octets, source ATM number bits to source NHRP ATM address source, ATM sub-address to zero, source protocol address bits to senders protocol address bits, target ATM number bits to NHRP ATM target address bits, target ATM subaddress bits to zero, target protocol address bits to NHRP target protocol address bits.

9. A method as claimed in claim 8 wherein said operation bits are set to NAK when NHRP P bit is set to zero.

10. A method as claimed in claim 8 wherein said operation bits are set to NAK when NHRP B bit is set to zero.

11. A method as claimed in claim 8 wherein bit 8 is set to zero.

12. A method as claimed in claim 11 wherein bit 7 is set to zero when ATM length equals 20.

13. A method as claimed in claim 11 wherein bit 7 is set to one.

14. A method as claimed in claim 11 wherein bit 1 through 6 are set to a first six bits of NHRP ATM length.

15. A method as claimed in claim 1 wherein said gateway does not issue a response to the source when NHRP holding time expires.

16. A method as claimed in claim 1 wherein said gateway does not issue a response to the source when purge packet is received.

17. A method as claimed in claim 1 wherein old information in said source due to old information in a NHRP gateway is quenched by issuing a new ATMARP query.

18. A method as claimed in claim 1 wherein a gateway returns a ATM ARP NAK when said gateway processes a non-empty sub-address.

19. A method of translating between a source including a ATMARP client and a network including an NHRP server 1, an NHRP server N, and a ATM/NHRP gateway including a ATMARP server and an NHRP client, said method comprising the steps of:

initiating an ATMARP procedure between said source and said ATMARP client, issuing an ARP-REQuest from said ATMARP client to said ATM/NHRP gateway, mapping said ARP-REQuest between said ATMARP server and said NHRP client, issuing a NHRP REQuest from said NHRP client to said NHRP server 1, forwarding said NHRP REQuest through said NHRP server 1 to said NHRP server N, issuing an NHRP-acknowledgment from said NHRP server N, forwarding said NHRP-acknowledgment through said NHRP server 1 to said ATM/NHRP gateway, Mapping said NHRP-acknowledgment between said NHRP client and said ATMARP server, forwarding said ATMARP acknowledgment back to said source.

20. A method of mapping between ATMARP and NHRP utilizing a network, comprising the steps of:

issuing an first ATM command from a source, translating said first ATM command into an first NHRP command in said network, resolving said first NHRP command, converting said resolved first NHRP command into a second ATM command in the network, and transmitting said second ATM command out of said network back to said source, thereby mapping between ATMARP and NHRP.

21. A communication system for mapping between ATMARP and NHRP, comprising:

a source including an ATMARP client therein, for issuing an ATMARP REQuest, a gateway including an ATM server, and an NHRP client therein, for receiving said ATMARP REQuest and translating said ATMARP REQuest into a NHRP REQuest, and at least one server for receiving and resolving said NHRP REQuest.

22. A method as claimed in claim 21 wherein said gateway is located in a network.

23. A method as claimed in claim 22 wherein said server is located in said network.

* * * * *